United States Patent
Sun et al.

(10) Patent No.: US 10,379,338 B2
(45) Date of Patent: Aug. 13, 2019

(54) MOBILE TERMINAL WITH A PERISCOPE OPTICAL ZOOM LENS

(71) Applicant: Huawei Technologies Co., Ltd., Shenzhen (CN)

(72) Inventors: Yufei Sun, Shanghai (CN); Hang Yin, Shenzhen (CN); Xinlu Peng, Shanghai (CN); Haitao Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 15/509,982

(22) PCT Filed: Sep. 11, 2014

(86) PCT No.: PCT/CN2014/086271
§ 371 (c)(1),
(2) Date: Mar. 9, 2017

(87) PCT Pub. No.: WO2016/037332
PCT Pub. Date: Mar. 17, 2016

(65) Prior Publication Data
US 2017/0307870 A1    Oct. 26, 2017

(51) Int. Cl.
*G02B 23/08*    (2006.01)
*G02B 15/167*    (2006.01)

(52) U.S. Cl.
CPC .......... *G02B 23/08* (2013.01); *G02B 15/167* (2013.01)

(58) Field of Classification Search
CPC .............................. G02B 23/08; G02B 15/167
USPC .................................................... 348/240.99
See application file for complete search history.

(56) References Cited

U.S. PATENT DOCUMENTS

| | | | |
|---|---|---|---|
| 7,508,593 B2 | 3/2009 | Nishimura | |
| 9,182,596 B2 | 11/2015 | Border et al. | |
| 9,523,847 B2 | 12/2016 | Li | |
| 2007/0024739 A1 | 2/2007 | Konno | |
| 2007/0281738 A1 | 12/2007 | Durand et al. | |
| 2009/0207500 A1 | 8/2009 | Katakura | |
| 2012/0300956 A1* | 11/2012 | Horii | G02C 11/10 381/71.6 |
| 2013/0021485 A1* | 1/2013 | Hsu | G02B 27/64 348/208.99 |

(Continued)

FOREIGN PATENT DOCUMENTS

| | | |
|---|---|---|
| CA | 2549950 A1 | 7/2005 |
| CN | 202841268 U | 3/2013 |

(Continued)

*Primary Examiner* — Antoinette T Spinks
(74) *Attorney, Agent, or Firm* — Slater Matsil, LLP

(57) ABSTRACT

A mobile terminal is provided. The mobile terminal includes a display screen on a terminal housing and a periscope optical zoom lens. The display screen and the periscope optical zoom lens are arranged in a non-overlapping manner in a thickness direction of the terminal, and the periscope optical zoom lens is located in a top area of the terminal. Additionally, the periscope optical zoom lens is configured to collect an image in an optical signal form by means of optical zoom, so that an optical-to-electrical conversion chip converts the image in an optical signal form into an image in a digital signal form and the display screen is configured to display the image in a digital signal form.

15 Claims, 4 Drawing Sheets

(56) References Cited

U.S. PATENT DOCUMENTS

| | | | | |
|---|---|---|---|---|
| 2015/0128073 A1* | 5/2015 | Ahn | ................. | G06F 3/0488 |
| | | | | 715/759 |
| 2015/0172522 A1* | 6/2015 | O'Neill | ................. | H04N 5/2252 |
| | | | | 348/240.3 |
| 2016/0157370 A1* | 6/2016 | Kanemaki | ................. | H04R 7/045 |
| | | | | 361/679.01 |
| 2016/0161733 A1* | 6/2016 | Li | ................. | G02B 23/08 |
| | | | | 348/360 |
| 2017/0261723 A1* | 9/2017 | Sun | ................. | G02B 13/009 |
| 2017/0366898 A1* | 12/2017 | Melanson | ................. | H04R 1/1041 |

FOREIGN PATENT DOCUMENTS

| | | |
|---|---|---|
| CN | 203219350 U | 9/2013 |
| CN | 103458165 A | 12/2013 |
| CN | 103513412 A | 1/2014 |
| CN | 203573023 U | 4/2014 |
| CN | 103856719 A | 6/2014 |
| CN | 203705786 U | 7/2014 |
| EP | 2761362 A2 | 8/2014 |
| JP | 2006109075 A | 4/2006 |

* cited by examiner

MOBILE TERMINAL WITH A PERISCOPE OPTICAL ZOOM LENS

CROSS-REFERENCE TO RELATED APPLICATIONS

This application is a national stage of International Application No. PCT/CN2014/086271, filed on Sep. 11, 2014, which is hereby incorporated by reference in its entirety.

TECHNICAL FIELD

The present invention relates to the field of electronic technologies, and in particular, to a mobile terminal.

BACKGROUND

With rapid development of an electronic information technology and an optical technology, a mobile terminal (for example, a mobile phone) plays an increasingly important role in daily life. Therefore, a user has a higher requirement for a function and an appearance of the mobile phone, especially photographing performance of the mobile phone.

A zoom technology is an important criterion to measure photographing performance of a mobile phone, and the zoom technology may be classified into digital zoom and optical zoom. The digital zoom is easy to implement and may be actually considered as electronic magnification of a picture, and some pixels on an original CCD (Charge-coupled Device) image sensor are magnified by means of interpolation processing. Therefore, by means of digital zoom, a photographed object is magnified, but definition of the photographed object is reduced.

The optical zoom implements zoom according to a structure of an optical camera, and an object that needs to be photographed is zoomed in or zoomed out by moving a lens of the camera. A larger optical zoom multiple indicates a longer distance at which an object can be photographed, and definition is not affected but can be improved. However, because the optical zoom implements zoom according to the structure of the optical camera, a mobile phone that uses the optical zoom technology to implement a photographing function is relatively thick and heavy and is not easy to carry. In addition, a function of the optical zoom is implemented by lens zooming, and therefore, an entire lens module has a relatively large size and is easy to damage.

SUMMARY

Embodiments of the present invention provide a mobile terminal, which resolves a problem in the prior art that imaging definition of a mobile terminal is relatively low because digital zoom is used and a problem in the prior art that an excessively thick and heavy mobile terminal is not easy to carry and is easy to damage because of zoom according to a structure of an optical camera.

To achieve the foregoing objective, the following technical solutions are adopted in the embodiments of the present invention.

According to a first aspect, the present invention provides a mobile terminal, where the mobile terminal includes a terminal housing, and the mobile terminal further includes a display screen located on the terminal housing and a periscope optical zoom lens. The mobile terminal also includes the display screen and the periscope optical zoom lens are arranged in a non-overlapping manner in a thickness direction, and the display screen and the periscope optical zoom lens are located in a top area of the terminal housing. Additionally, the mobile terminal includes the periscope optical zoom lens is configured to collect an image in an optical signal form by means of optical zoom, so that an optical-to-electrical conversion chip converts the image in an optical signal form into an image in a digital signal form. The display screen is configured to display the image in a digital signal form.

In a first possible implementation manner of the first aspect, the mobile terminal further includes a piezoelectric speaker located on the terminal housing and a transparent panel located on the display screen, the periscope optical zoom lens, and the piezoelectric speaker; any two of the display screen, the periscope optical zoom lens, and the piezoelectric speaker are arranged in a non-overlapping manner in the thickness direction, and the piezoelectric speaker and the transparent panel are in contact with each other; the piezoelectric speaker is configured to generate sound pressure according to a trigger signal of an AP (Appellation Processor) to cause the transparent panel to vibrate; and the transparent panel is configured to vibrate according to the sound pressure generated by the piezoelectric speaker.

With reference to the first possible implementation manner of the first aspect, in a second possible implementation manner of the first aspect, the mobile terminal further includes the optical-to-electrical conversion chip, a motor drive chip, and an optical image stabilization drive chip that are separately connected to the periscope optical zoom lens; the optical-to-electrical conversion chip is configured to convert the image in an optical signal form that is collected by the periscope optical zoom lens into the image in a digital signal form; the motor drive chip is configured to adjust the periscope optical zoom lens to implement optical zoom; and the optical image stabilization drive chip is configured to correct the image in an optical signal form that is collected by the periscope optical zoom lens.

With reference to the second possible implementation manner of the first aspect, in a third possible implementation manner of the first aspect, the mobile terminal further includes the AP that is connected to each of the piezoelectric speaker, the display screen, the optical-to-electrical conversion chip, the motor drive chip, and the optical image stabilization drive chip; and the AP is configured to: obtain the image in a digital signal form that is output by the optical-to-electrical conversion chip, and output the image in a digital signal form to the display screen; generate the trigger signal to instruct the piezoelectric speaker to generate the sound pressure; generate a first control signal to instruct the motor drive chip to adjust the periscope optical zoom lens to implement optical zoom; and generate a second control signal to instruct the optical image stabilization drive chip to correct the image in an optical signal form that is collected by the periscope optical zoom lens.

With reference to the third possible implementation manner of the first aspect, in a fourth possible implementation manner of the first aspect, the mobile terminal further includes a flash connected to the AP; and the flash is configured to increase exposure for the image collected by the periscope optical zoom lens.

The embodiments of the present invention provide a mobile terminal, and the mobile terminal collects an image by means of optical zoom, which improves imaging definition and imaging quality. In addition, positions of a periscope optical zoom lens and a display screen inside the mobile terminal are newly arranged, to ensure that the periscope optical zoom lens, the display screen, and a piezoelectric speaker are arranged in a non-overlapping manner in a thickness direction. Therefore, the optical zoom camera is completely built in the mobile terminal, and a thickness and a weight of the mobile terminal are greatly reduced. In this way, photographing performance and portability of the mobile terminal are effectively combined, which resolves a problem in the prior art that imaging definition of a mobile terminal is relatively low because digital zoom is used and a problem in the prior art that an excessively thick and heavy mobile terminal is not easy to carry and is easy to damage because of zoom according to a structure of an optical camera.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

To facilitate understanding of a mobile terminal provided in the embodiments of the present invention, some conceptions related to the present invention are first described.

Digital zoom is increasing an area of each pixel in an image by using a processor inside a mobile terminal to magnify the image. That is, an area of the image is increased by using image processing software, some pixels on an original charge coupled device (CCD) image sensor are magnified by means of "interpolation" processing, and a picture is magnified to an entire picture based on the pixels on the CCD image sensor by using an interpolation algorithm. Because the digital zoom implements a zoom effect based on a change of a photosensitive device in a vertical direction, if an area in the photosensitive device is small, visually, a user may see only a part of an object. However, an actual focal length does not change, and therefore, image quality is poorer than that in a normal case.

Optical zoom implements zoom according to a structure of an optical camera. The optical zoom is implemented based on a change in positions of a lens, an object, and a focal point. When an image plane moves in a horizontal direction, vision and a focal length change, and a farther object becomes clearer, which makes people feel as if the object moves closer. The optical zoom changes a focal length by moving a lens in the camera to implement zooming in or zooming out of an image. The zooming in or zooming out of an image is implemented by using a principle of physics, and in a process of zooming in or zooming out, a photosensitive element performs photoreception directly on a photographed object and forms an image without any other electronic magnification processing. In addition, in the process of zooming in or zooming out, the photosensitive element globally forms an image, and the image can maintain original highest resolution. Therefore, in an image obtained by means of optical zoom, a photographed object is zoomed in, and definition is relatively improved.

In addition, the mobile terminal provided in the embodiments of the present invention may be a mobile phone, an I-PAD™, or the like. For ease of understanding, an example of a mobile phone is used for description in the following embodiments, where the mobile phone may be a smartphone or a feature phone, which is not limited in the present invention.

Figure 1:
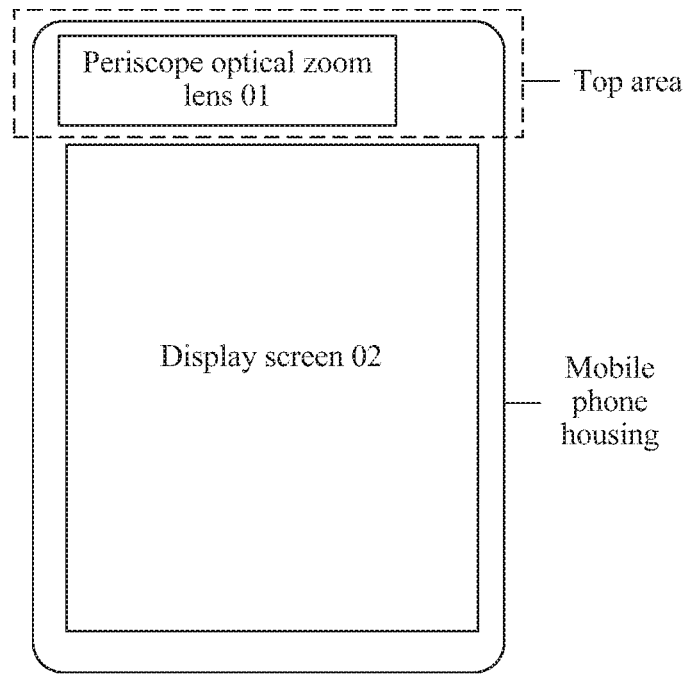
FIG. 1 is a first schematic structural diagram of a mobile terminal according to an embodiment of the present invention.

An embodiment of the present invention provides a mobile phone, where the mobile phone includes a mobile phone housing. As shown in FIG. 1, the mobile phone further includes a periscope optical zoom lens 01 and a display screen 02 that is located on the mobile phone housing.

Figure 1A:
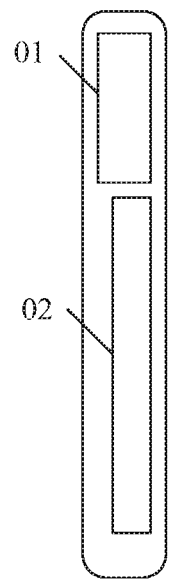
FIG. 1a is a first structural side view of a mobile terminal according to an embodiment of the present invention.

The periscope optical zoom lens 01 and the display screen 02 are arranged in a non-overlapping manner in a thickness direction, and the periscope optical zoom lens 01 is located in a top area of the mobile phone. As shown in FIG. 1a, FIG. 1a is a left view of a spatial arrangement of the periscope optical zoom lens 01 and the display screen 02 with reference to FIG. 1, and the periscope optical zoom lens 01 and the display screen 02 are arranged in a non-overlapping manner in the thickness direction. In this way, impact of a volume of the periscope optical zoom lens 01 on a thickness of the mobile phone can be fully reduced.

Specifically, the periscope optical zoom lens 01 is configured to collect an image in an optical signal form by means of optical zoom, so that an optical-to-electrical conversion chip converts the image in an optical signal form into an image in a digital signal form; and the display screen 02 is configured to display the image in a digital signal form.

Optical zoom systems may be classified into multiple types according to different optical structure characteristics. According to zooming and optical structure manners, the periscope optical zoom lens 01 may be classified into a straight periscope optical zoom lens 01 and the periscope optical zoom lens 01.

The straight optical zoom lens adjusts a focal length by zooming sleeves, to achieve an effect of framing and photographing at a wide angle or at a long distance. An optical characteristic of the straight optical zoom lens is: during zooming, an optical axis and a focal plane that are of the lens are always perpendicular. Because the optical axis and the focal plane of the straight optical zoom lens form an angle of 90 degrees, when long-focus photographing is performed, a mobile phone is relatively thick, which becomes a bottleneck in miniaturization design of a mobile phone. In addition, the lens extends for a relatively long distance, and may be damaged under an effect of unexpected external force.

The periscope optical zoom lens 01 is used in this embodiment of the present invention, where the periscope optical zoom lens 01 is commonly referred to as an internal zoom lens or as a folding optical lens. Because optical zoom is completed inside the lens, a filter can be easily installed in the periscope optical zoom lens 01 without additionally installing a lens cone. In addition, a lens cone length of a periscope optical zoom lens is fixed, and the lens is small. Therefore, sealing processing may be very convenient, and stealing performance is good. The filter may be located on the mobile phone housing.

Figure 2:
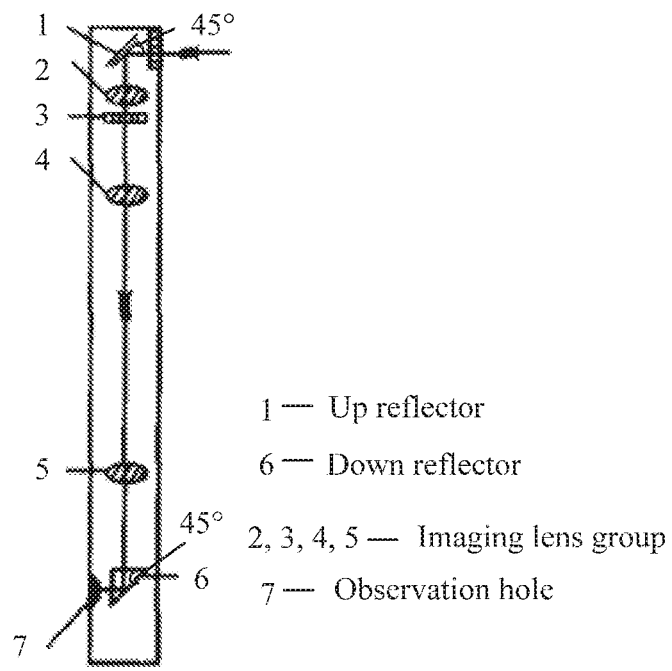
FIG. 2 is a schematic structural diagram of a periscope optical zoom lens.

In the periscope optical zoom lens 01, there are two plane mirrors (in a practical instrument, the two plane mirrors may be replaced with one or two dispersive prisms) placed at slopes of 45 degrees. As shown in FIG. 2, 1 represents an up reflector of the periscope optical zoom lens 01; 6 represents a down reflector of the periscope optical zoom lens 01; 2, 3, 4, and 5 represent an imaging lens group of the periscope optical zoom lens 01; 7 represents an observation hole. In this way, a light of an object linearly transmits at an upper end of the periscope optical zoom lens 01, and the light is reflected when reaching the plane mirror, then passes through the imaging lens group 2, 3, 4, and 5, and finally reflected to the observation hole 7, so that an image in an optical signal form that is collected by the periscope optical zoom lens 01 is output through the observation hole 7. It can be learned that an optical characteristic of the periscope optical zoom lens 01 is: an optical axis and a focal plane that are of the lens are parallel, and an optical axis and a focal plane that are of a light reflected by a prism are perpendicular. A thickness of a lens made according to this optical characteristic can be obviously decreased.

Further, a photosensitive element (such as, a CCD or a complementary metal oxide semiconductor (CMOS)) may be disposed after the observation hole 7, so that the image in an optical signal form that is collected by the periscope optical zoom lens 01 is converted into the image in a digital signal form.

Correspondingly, further, only the up reflector 1 and the imaging lens group 2, 3, 4, and 5 may be disposed inside the periscope optical zoom lens 01; in this way, the photosensitive element (such as, a CCD or a CMOS) may be disposed after the imaging lens 5, so that the image in an optical signal form that is collected by the periscope optical zoom lens 01 is converted into the image in a digital signal form.

In the mobile phone provided in this embodiment of the present invention, according to features of high imaging quality, a small thickness, and a small volume of the periscope optical zoom lens 01, the periscope optical zoom lens 01 is built in the mobile phone with the periscope optical zoom lens 01; positions of the periscope optical zoom lens 01 and the display screen 02 inside the mobile phone are newly arranged, to ensure that the periscope optical zoom lens 01 and the display screen 02 are arranged in a non-overlapping manner in a same thickness direction, which reduces a thickness and a weight of the mobile phone, and effectively combines photographing performance and portability of the mobile phone.

Optionally, the display screen 02 may be configured in a form of an LCD (Liquid Crystal Display), an OLED (Organic Light-Emitting Diode), or the like. Further, a touch control function may be integrated into the display screen 02 provided in this embodiment of the present invention. When the display screen 02 detects a touch operation on or near the display screen 02, the display screen 02 transmits the touch operation to an AP (Appellation Processor) in the mobile phone to determine a type of a touch event, and then the AP provides corresponding visual output on the display screen 02 according to the type of the touch event.

The periscope optical zoom lens 01 and the display screen 02 are arranged in a non-overlapping manner in the thickness direction, and the periscope optical zoom lens 01 is disposed in the top area of the mobile phone. Therefore, such a spatial arrangement causes a case in which a traditional earpiece (for example, a Receiver speaker) that originally needs to be placed at a center position of the top area of the mobile phone needs to be placed in a position that is at a distance of 16 millimeters from the center position, and consequently, an audio test of pre-development certification of a mobile phone cannot be passed.

Specifically, the traditional earpiece is made of a moving-coil component according to an electromagnetic induction phenomenon. When a sound wave makes a metal membrane vibrate, a coil (referred to as a voice coil) connected to the membrane vibrates along with the metal membrane, and the voice coil vibrates in a magnetic field of a permanent magnet, where an induced current (electrical signal) is generated. The induced current changes in both magnitude and direction, where amplitude and frequency of the change depend on the sound wave. The induced current is sent to a speaker after amplified by a loudspeaker, and an amplified sound is emitted from the speaker. However, when this traditional earpiece is used, the traditional earpiece needs to be disposed in a position less than 8 millimeters from the center position, so that a sound emitted from the traditional earpiece reaches a parameter indicator of the audio test. Therefore, a piezoelectric speaker 03 and a transparent panel 04 are used in this embodiment of the present invention to resolve the foregoing problem.

Figure 3:
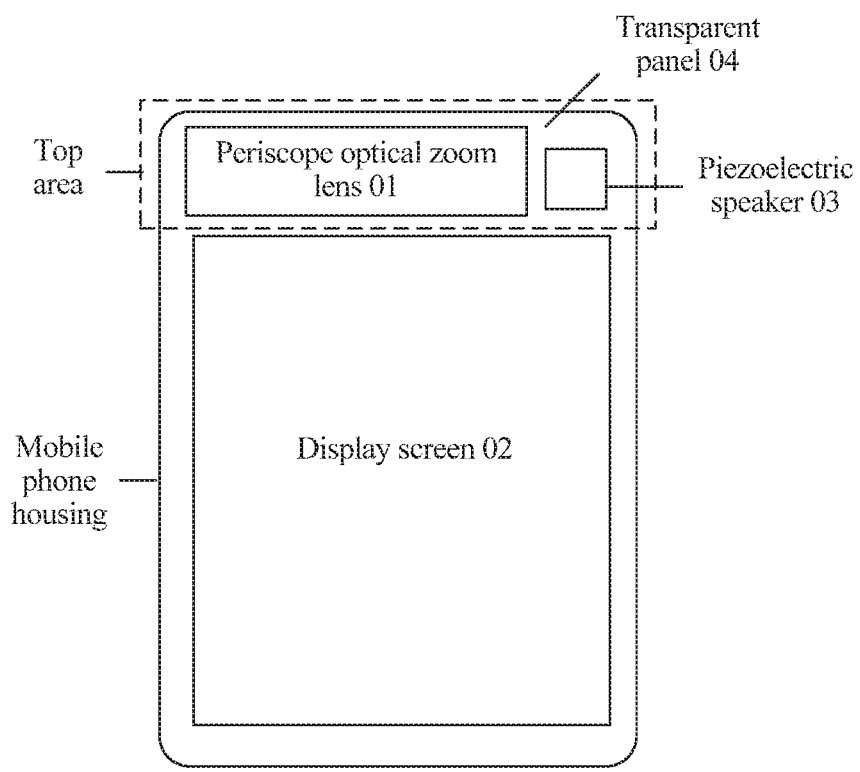
FIG. 3 is a second schematic structural diagram of a mobile terminal according to an embodiment of the present invention.

As shown in FIG. 3, the mobile phone further includes the piezoelectric speaker 03 located on the terminal housing and the transparent panel 04 located on the display screen 02, the periscope optical zoom lens 01, and the piezoelectric speaker 03.

Any two of the display screen 02, the periscope optical zoom lens 01, and the piezoelectric speaker 03 are arranged in a non-overlapping manner in the thickness direction, and the piezoelectric speaker 03 and the transparent panel 04 are in contact with each other.

The piezoelectric speaker 03 is configured to generate sound pressure according to a trigger signal of the AP to cause the transparent panel to vibrate; and the transparent panel 04 is configured to vibrate according to the sound pressure generated by the piezoelectric speaker.

Figure 3A:
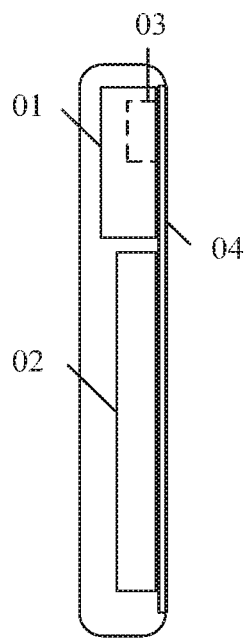
FIG. 3a is a second structural side view of a mobile terminal according to an embodiment of the present invention.

Specifically, an OCA (Optically Clear Adhesive) may be used to bond the transparent panel 04 to the display screen 02. As shown in FIG. 3*a*, FIG. 3*a* is a left view of a spatial arrangement of the periscope optical zoom lens 01, the display screen 02, the piezoelectric speaker 03, and the transparent panel 04 with reference to FIG. 3.

For example, the piezoelectric speaker 03 may be bond to the transparent panel 04. When the piezoelectric speaker 03 is under control of the trigger signal output by the AP, the piezoelectric speaker 03 generates sound pressure, and the transparent panel 04 receives the sound pressure generated by the piezoelectric speaker 03 and then vibrates to make a sound. In this way, a sound may be made by combining the piezoelectric speaker 03 and the transparent panel 04 without using the traditional earpiece. In addition, a sound effect of sounding by vibrating after the piezoelectric speaker 03 and the transparent panel 04 are combined may completely pass the audio test of pre-development certification of the mobile phone.

In addition, the piezoelectric speaker 03, the periscope optical zoom lens 01, and the display screen 02 are arranged in a non-overlapping manner in the thickness direction (as shown in FIG. 3a), and therefore, such a spatial arrangement may avoid impact of the periscope optical zoom lens 01 on the thickness of the mobile phone.

For example, the piezoelectric speaker 03 may be a ceramic piezoelectric speaker. The ceramic piezoelectric speaker is a lead-free ceramic piezoelectric sounding element, which includes a metal sheet and a ceramic piezoelectric sheet, where two or more ceramic piezoelectric sheets in a same size successively and closely bond on a surface of the metal sheet, and polarization directions of adjacent ceramic piezoelectric sheets are opposite. Sound pressure generated by the piezoelectric speaker 03 in this new structure is directly proportional to a quantity of ceramic piezoelectric sheets, where a larger quantity indicates higher sound pressure. High sound pressure is easy to implement by increasing the quantity of ceramic piezoelectric sheets, a production technique of the piezoelectric speaker is simple and production costs are relatively low.

Optionally, the transparent panel 04 may be a glass panel, a sapphire panel, or the like. The transparent panel 04 and the display screen 02 cooperate to complete functions of touch control input and display. A possible implementation manner is described above, that is, a touch control function is integrated into the display screen 02 to complete the functions of touch control input and display. In another possible implementation manner, a touch control function may be integrated into the transparent panel 04, so that the transparent panel 04 and the display screen 02 are integrated to form a TP (Touch panel), to complete the mobile phone functions of touch control input and display. TPs may be classified into three parts according to function: a sensor, a controller, and software. The sensor is a part of receiving a message that is entered by means of contact and may be disposed on the transparent panel. A function of the controller is analyzing and calculating a position of a contact point, converting an analog signal into a digital signal, and transmitting the digital signal to the AP, which may be completed by a circuit integrated inside the display screen 02; in addition, the display screen 02 may further receive and display an output command of the AP. The software part connects to communication and agreement between the AP and the controller, so that the AP may receive and identify the digital signal that is input by the controller, so as to perform subsequent processing actions.

Figure 4:
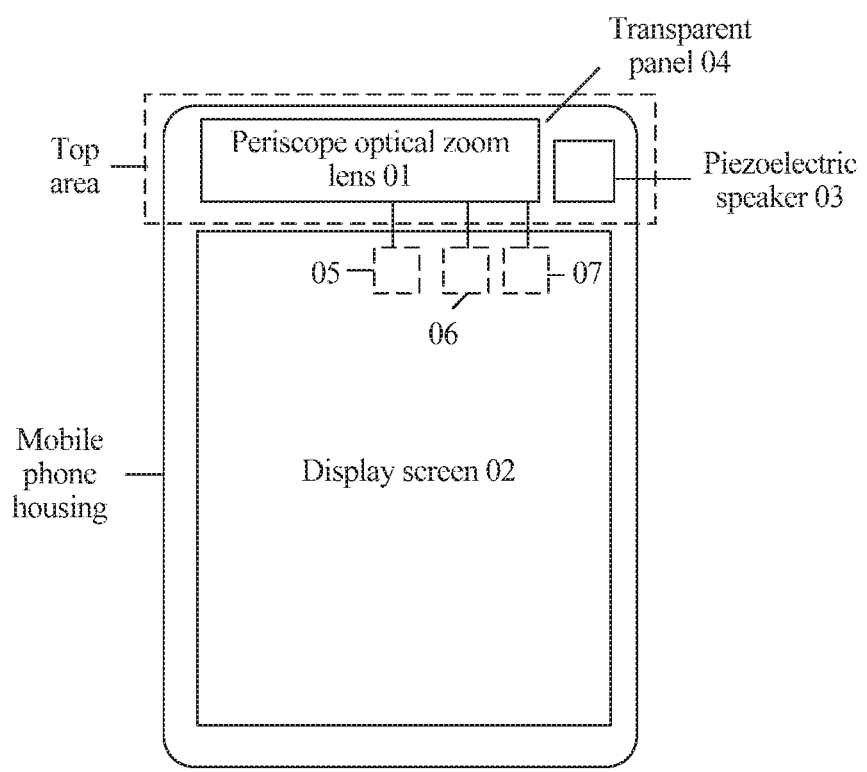
FIG. 4 is a third schematic structural diagram of a mobile terminal according to an embodiment of the present invention.

Further, as shown in FIG. 4, the mobile terminal further includes the optical-to-electrical conversion chip 05, a motor drive chip 06, and an optical image stabilization drive chip 07 that are separately connected to the periscope optical zoom lens 01; where: the optical-to-electrical conversion chip 05 is configured to convert the image in an optical signal form that is collected by the periscope optical zoom lens 01 into the image in a digital signal form; the motor drive chip 06 is configured to adjust the periscope optical zoom lens 01 to implement optical zoom; and the optical image stabilization drive chip 07 is configured to correct the image in an optical signal form that is collected by the periscope optical zoom lens 01.

It should be noted that the periscope optical zoom lens 01, the optical-to-electrical conversion chip 05, the motor drive chip 06, and the optical image stabilization drive chip 07 are arranged in a non-overlapping manner in a thickness direction, which reduces the thickness and the weight of the mobile phone and effectively combines photographing performance and portability of the mobile terminal.

Specifically, the optical-to-electrical conversion chip 05 may include a photosensitive element such as a CCD (Charge-coupled Device) or a CMOS (Complementary Metal Oxide Semiconductor). A function of each of the CCD and the CMOS is converting a light into a digital signal, and then the digital signal is sent to the AP for output.

Further, the optical-to-electrical conversion chip 05 may be carried on a printed circuit board, and a process of photoelectric signal transmission between the periscope optical zoom lens 01 and the optical-to-electrical conversion chip 05 is implemented by using the printed circuit board. Similarly, the motor drive chip 06 and the optical image stabilization drive chip 07 are respectively located on a motor printed circuit board and an optical image stabilization printed circuit board and respectively implement a process of photoelectric signal transmission between the periscope optical zoom lens 01 and the motor drive chip 06 and a process of photoelectric signal transmission between the periscope optical zoom lens 01 and the optical image stabilization drive chip 07.

Figure 5:
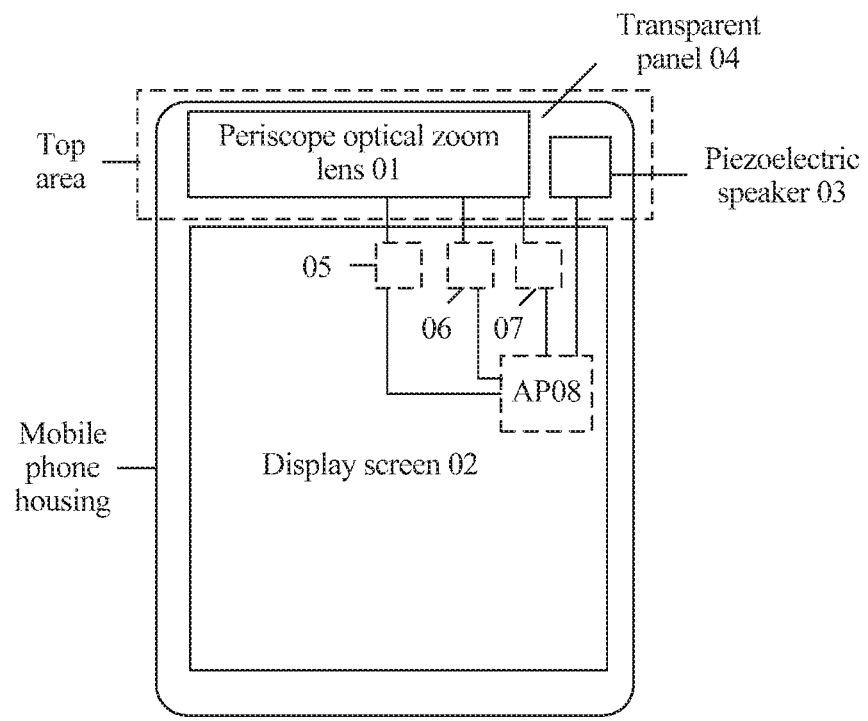
FIG. 5 is a fourth schematic structural diagram of a mobile terminal according to an embodiment of the present invention.

Further, as shown in FIG. 5, the mobile terminal further includes the AP 08 that is connected to each of the piezoelectric speaker 03, the display screen 02, the optical-to-electrical conversion chip 05, the motor drive chip 06, and the optical image stabilization drive chip 07.

The AP 08 is configured to: obtain the image in a digital signal form that is output by the optical-to-electrical conversion chip 05 and the periscope optical zoom lens, and output the image in a digital signal form to the display screen 02; generate a trigger signal to instruct the piezoelectric speaker 03 to generate sound pressure; generate a first control signal to instruct the motor drive chip 06 to adjust the periscope optical zoom lens 01 to implement optical zoom; and generate a second control signal to instruct the optical image stabilization drive chip 07 to correct the image in an optical signal form that is collected by the periscope optical zoom lens 01.

In addition, the AP 08 may include an image processor, that is, an ISP (Image Signal Processing) chip, where the image signal processing chip is configured to process the image in a digital signal form that is output by the optical-to-electrical conversion chip 05.

As shown in FIG. 5, the periscope optical zoom lens collects an image in an optical signal form by means of optical zoom, and sends the image in an optical signal form to the optical-to-electrical conversion chip 05 for image processing, so as to convert the image in an optical signal form into an image in a digital signal form. In addition, the optical-to-electrical conversion chip 05 cooperates with the motor drive chip 06 and the optical image stabilization drive chip 07 to perform zoom and correction on the periscope optical zoom lens, and finally sends the image in a digital signal form to the AP 08, so that the ISP chip in the AP 08 performs data processing. The display screen 02 is used to output the image in a digital signal form, and present visual output of a captured image to a user. In addition, the AP 08 may further output a trigger signal to control the piezoelectric speaker 03 and the transparent panel 04 to make a sound. When the AP outputs the trigger signal to instruct the piezoelectric speaker 03 to make a sound, the piezoelectric speaker 03 generates sound pressure, and in this case, the transparent panel 04 vibrates to make a sound according to the sound pressure generated by the piezoelectric speaker 03.

Thus far, collection, optical-to-electrical conversion, and final output are implemented on an image in a case of optical zoom according to a proper spatial arrangement of components in the mobile phone, and photographing performance and portability of the mobile terminal are effectively combined to improve user experience.

Figure 6:
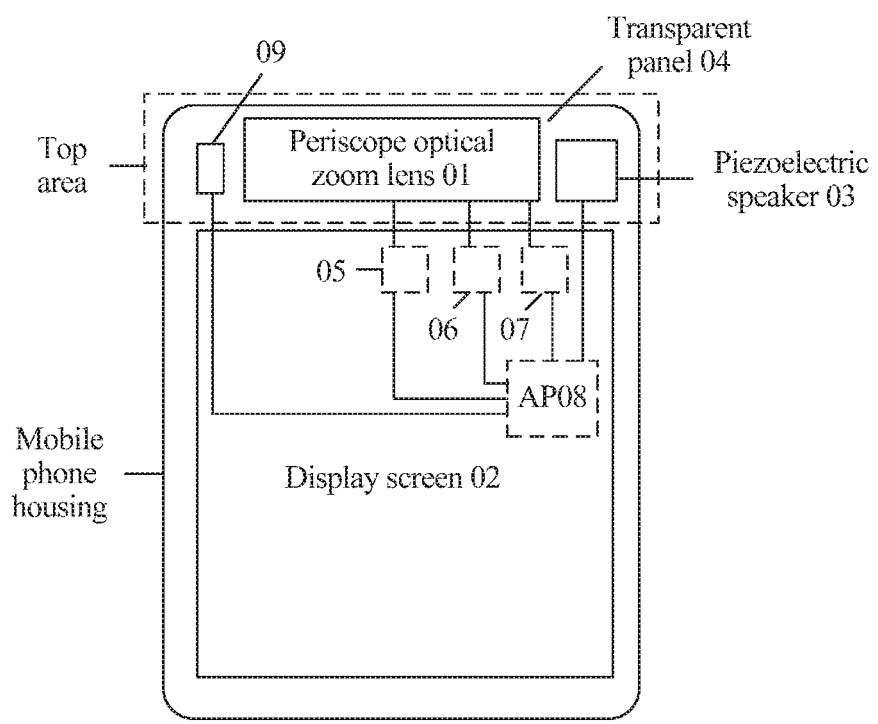
FIG. 6 is a fifth schematic structural diagram of a mobile terminal according to an embodiment of the present invention.

Further, as shown in FIG. 6, the mobile terminal further includes a flash 09 connected to the AP 08.

The flash 09 is configured to increase exposure for the image collected by the periscope optical zoom lens. The flash 09 can emit an extremely strong light in an extremely short time, is mostly used for momentary lighting in an occasion with relatively dim lights, and is also used for partial light filling for a photographed object in an occasion with relatively bright lights.

The mobile phone terminal provided in this embodiment of the present invention includes a display screen located on the terminal housing and a periscope optical zoom lens, where the display screen and the periscope optical zoom lens are arranged in a non-overlapping manner in a thickness direction, and the periscope optical zoom lens is located in a top area of the terminal housing. The mobile terminal collects an image by means of optical zoom, which improves imaging definition and imaging quality. In addition, positions of the periscope optical zoom lens and the display screen inside the mobile terminal are newly arranged, to ensure that the periscope optical zoom lens, the display screen, and a piezoelectric speaker are arranged in a non-overlapping manner in a same thickness direction. Therefore, the periscope optical zoom lens is completely built into the mobile terminal, and a thickness and a weight of the mobile terminal are greatly reduced. In this way, photographing performance and portability of the mobile terminal are effectively combined, which resolves a problem in the prior art that imaging definition of a mobile terminal is relatively low because digital zoom is used and a problem in the prior art that an excessively thick and heavy mobile terminal is not easy to carry and is easy to damage because of zoom according to a structure of an optical camera.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A mobile terminal, comprising:
  a terminal housing, wherein the mobile terminal further comprises:
    a display screen located on the terminal housing; and
    a periscope optical zoom lens located in a top area of the terminal housing; and
  an optical-to-electrical conversion chip;
  wherein the display screen and the periscope optical zoom lens are disposed side-by-side along a first direction, wherein the display screen and the periscope optical zoom lens do not overlap along a thickness direction of the terminal housing, the thickness direction of the terminal housing being perpendicular to the first direction;
  wherein the periscope optical zoom lens is configured to collect an image in an optical signal form using optical zoom;
  wherein the optical-to-electrical conversion chip is configured to convert the image in the optical signal form into an image in a digital signal form; and
  wherein the display screen is configured to display the image in the digital signal form.

2. The mobile terminal according to claim 1, wherein the mobile terminal further comprises a piezoelectric speaker located on the terminal housing and a transparent panel located on the display screen, the periscope optical zoom lens, and the piezoelectric speaker;
  wherein at least two of the display screen, the periscope optical zoom lens, and the piezoelectric speaker are arranged in a non-overlapping manner in the thickness direction of the terminal housing, and wherein the piezoelectric speaker is in contact with the transparent panel;
  wherein the piezoelectric speaker is configured to generate sound pressure to cause the transparent panel to vibrate; and
  wherein the transparent panel is configured to vibrate according to the sound pressure generated by the piezoelectric speaker.

3. The mobile terminal according to claim 2, wherein the mobile terminal further comprises a motor drive chip and an optical image stabilization drive chip, wherein the optical-to-electrical conversion chip, the motor drive chip, and the optical image stabilization drive chip are separately connected to the periscope optical zoom lens;

wherein the optical-to-electrical conversion chip is configured to convert the image in the optical signal form that is collected by the periscope optical zoom lens into the image in the digital signal form;

wherein the motor drive chip is configured to adjust the periscope optical zoom lens to implement optical zoom; and wherein the optical image stabilization drive chip is configured to correct the image in the optical signal form that is collected by the periscope optical zoom lens.

4. The mobile terminal according to claim 3, wherein the mobile terminal further comprises an application processor (AP) that is connected to the piezoelectric speaker, to the display screen, to the optical-to-electrical conversion chip, to the motor drive chip, and to the optical image stabilization drive chip; and wherein the AP is configured to:
  obtain the image in the digital signal form that is output by the optical-to-electrical conversion chip;
  output the image in the digital signal form to the display screen;
  generate a trigger signal to instruct the piezoelectric speaker to generate sound pressure;
  generate a first control signal to instruct the motor drive chip to adjust the periscope optical zoom lens to implement optical zoom; and
  generate a second control signal to instruct the optical image stabilization drive chip to correct the image in the optical signal form that is collected by the periscope optical zoom lens.

5. The mobile terminal according to claim 4, wherein the mobile terminal further comprises a flash connected to the AP, and wherein the flash is configured to increase exposure for the image collected by the periscope optical zoom lens.

6. The mobile terminal according to claim 1, wherein the periscope optical zoom lens comprises a first reflector, an imaging lens group and a second reflector, a light of an object transmits, through the first reflector, the imaging lens group and the second reflector, towards the optical-to-electrical conversion chip.

7. The mobile terminal according to claim 1, wherein the periscope optical zoom lens comprises a reflector and an imaging lens, a light of an object transmits, through the reflector and the imaging lens, towards the optical-to-electrical conversion chip.

8. A method, comprising:
  collecting, by a periscope optical zoom lens located in a top area of a terminal housing, using optical zoom, an image in an optical signal form;
  converting, by an optical-to-electrical conversion chip of the terminal housing, the image in the optical signal form into an image in a digital signal form; and
  displaying, by a display screen on the terminal housing, the image in the digital signal form, wherein the display screen and the periscope optical zoom lens are disposed side-by-side along a first direction, wherein the display screen and the periscope optical zoom lens do not overlap along a thickness direction of the terminal housing, the thickness direction of the terminal housing being perpendicular to the first direction.

9. A mobile terminal, comprising:
  a terminal housing, wherein the mobile terminal further comprises:
    a display screen located on the terminal housing; and
    a periscope optical zoom lens located in a top area of the terminal housing;
  an optical-to-electrical conversion chip coupled to the periscope optical zoom lens and to the display screen; and
  a transparent panel located on the display screen and on the periscope optical zoom lens; and
  wherein the display screen and the periscope optical zoom lens are disposed side-by-side along a first direction, wherein the display screen and the periscope optical zoom lens do not overlap along a thickness direction of the terminal housing, the thickness direction of the terminal housing being perpendicular to the first direction.

10. The mobile terminal according to claim 9, wherein the mobile terminal further comprises a piezoelectric speaker, wherein the transparent panel is further located on the piezoelectric speaker, wherein at least two of the display screen, the periscope optical zoom lens, and the piezoelectric speaker are arranged in a non-overlapping manner in the thickness direction of the terminal housing, and wherein the piezoelectric speaker is in contact with the transparent panel.

11. The mobile terminal according to claim 10, wherein the mobile terminal further comprises:
  a motor drive chip; and
  an optical image stabilization drive chip, wherein the optical-to-electrical conversion chip, the motor drive chip, and the optical image stabilization drive chip are separately connected to the periscope optical zoom lens.

12. The mobile terminal according to claim 11, wherein the mobile terminal further comprises an application processor (AP) that is connected to the piezoelectric speaker, to the display screen, to the optical-to-electrical conversion chip, to the motor drive chip, and to the optical image stabilization drive chip.

13. The mobile terminal according to claim 12, wherein the mobile terminal further comprises a flash connected to the AP.

14. The mobile terminal according to claim 9, wherein the periscope optical zoom lens comprises a first reflector, an imaging lens group and a second reflector, a light of an object transmits, through the first reflector, the imaging lens group and the second reflector, towards the optical-to-electrical conversion chip.

15. The mobile terminal according to claim 9, wherein the periscope optical zoom lens comprises a reflector and an imaging lens, a light of an object transmits, through the reflector and the imaging lens, towards the optical-to-electrical conversion chip.

* * * * *